United States Patent [19]
Whitesel

[11] 4,167,363
[45] Sep. 11, 1979

[54] COUNTERBORE CUTTING TOOL

[76] Inventor: Lowell E. Whitesel, 506 Enfield Rd., Columbus, Ohio 43209

[21] Appl. No.: 803,160

[22] Filed: Jun. 3, 1977

[51] Int. Cl.² ............................................. B23B 51/00
[52] U.S. Cl. .................................. 408/201; 408/226; 408/230; 408/233
[58] Field of Search ............... 408/201, 199, 226, 233, 408/239, 238, 229, 230, 231, 232

[56] References Cited

U.S. PATENT DOCUMENTS

| | | | |
|---|---|---|---|
| 1,408,947 | 3/1922 | Johnson | 408/201 |
| 1,464,298 | 8/1923 | Stein | 408/201 |
| 2,009,168 | 7/1935 | Dettmer | 408/201 |
| 2,493,039 | 1/1950 | Sochia | 408/233 X |

Primary Examiner—Gil Weidenfeld
Attorney, Agent, or Firm—Francis T. Kremblas, Jr.

[57] ABSTRACT

An improved counterbore end cutting tool characterized by a unique construction wherein the shank driver, the cutting head, and the pilot shank are removably mounted together. Additionally, the cutter head is manufactured in a manner to provide a novel reversible feature which permits it to be reversed to cut from either end. The cutting head and the holder include a novel driving connection feature wherein the teeth at one end of the cutting head which are not being used, mate with appropriate recesses in the holder to provide the driving connection between the holder and cutting head.

4 Claims, 5 Drawing Figures

COUNTERBORE CUTTING TOOL

BACKGROUND

Cutting tools such as counterbore cutters typically employed in the industry are generally used for rugged cutting operation and are primarily made of expensive material such as high speed steel. Prior to the present invention, these tools were made from a blank of this expensive material to integrally form both the standard shank driver as well as the cutting head itself. The cutting head and the integrally formed shank driver are then mounted in an appropriate conventional holder which includes a shank portion adapted to fit standard machines.

This prior construction requires that the shank driver as well as the cutting head be made of the very expensive high speed steel. Of course, this type of material is more difficult to machine and therefore the expense of this type of tool is further increased. After the cutting head becomes worn through use, it is discarded which also neccessitates discarding the otherwise useful shank portion.

Therefore cutters of this type are relatively expensive and their constructions contributes to the waste of very expensive material. The solution to this long standing problem resides in finding a better construction which provides the necessary qualities demanded of such a tool and yet eliminates the prior waste of materials and maximizes the useful life of the tool while minimizing the cost of manufacture.

SUMMARY OF PRESENT INVENTION

The present invention relates generally to cutting tools and particularly to end cutting tools referred to as counterbore cutters. The tool of the present invention comprises a novel construction wherein the driving shank, the cutting head, and the pilot head are separately constructed but form a removably connected assembly. Further, the cutting head includes a novel reversible cutting tool construction which permits the head to be mounted in reverse relationship to provide a new cutting end after the opposing end is worn.

The shank portion and the cutting head also cooperate with one another to form a driving engagement between them wherein the teeth of the cutter are designed to engage appropriate slots formed on the shank portion.

Therefore, the tool of the present invention represents a very significant saving in manufacturing costs and in reducing waste of a high cost material since only the cutting head need be made of expensive high speed steel. The shank driver portion and the pilot head can be made of less expensive material and further they may be reused after both cutting ends of the cutter head have reached the end of their useful life.

OBJECTS

It is therefore an object of the present invention to provide a novel counterbore cutter which is much less expensive to manufacture and which possesses a longer useful life without sacrificing the quality of the tool's performance.

It is another object of the present invention to provide a tool of the type described which embodies a unique construction wherein the shank driver portion and the cutting head are separately made to permit savings in the high cost material normally employed in this type of cutting tool.

It is another object of the present invention to provide a tool of the type described which incorporates a novel reversible cutting head wherein two end cutting surfaces are provided on the same head.

It is a further object of the present invention to provide a tool of the type described wherein the shank driver and the cutting head are constructed to cooperate in a unique, yet simple manner to provide a secure driving engagement between them.

It is yet another object of the present invention to provide a tool of the type described which is of a simple construction to permit assembly and disassembly in a quick and convenient manner.

IN THE DRAWINGS

DETAILED DESCRIPTION

Figure 1:
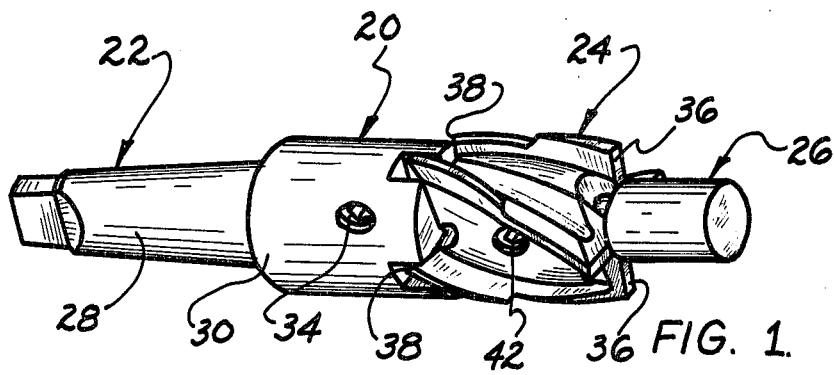
FIG. 1 is a perspective view of a counterbore cutting tool shown in assembly and constructed in accordance with the present invention.

A counterbore cutting tool constructed in accordance with the present invention is shown fully assembled in FIG. 1 and indicated generally at 20.

Figure 2:
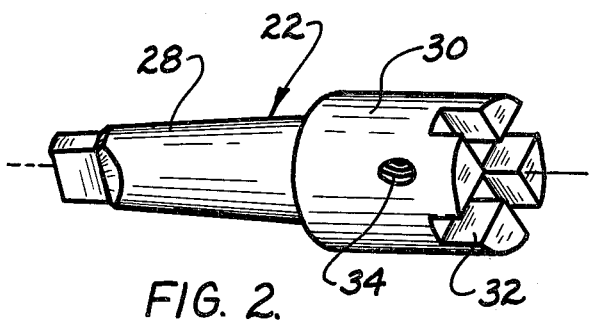
FIG. 2 is a perspective view of a portion of the tool shown in FIG. 1 illustrating the shank driver portion removed from the remainder of the assembly.
Figure 3:
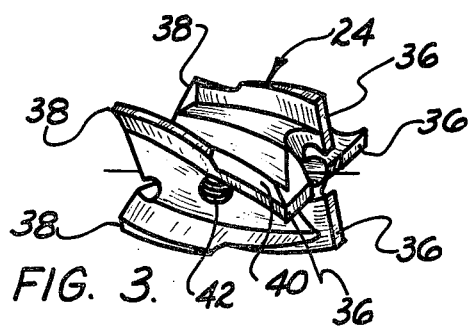
FIG. 3 is a perspective view of a portion of the tool shown in FIG. 1 illustrating the reversible, double headed cutter portion removed from the remainder of the assembly.
Figure 4:
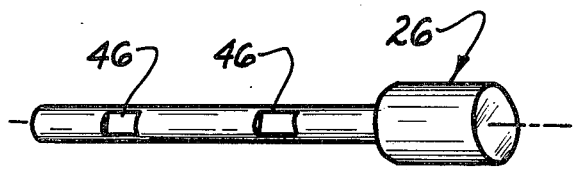
FIG. 4 is a perspective view of a portion of the tool shown in FIG. 1 illustrating the pilot head and its shank removed from the remainder of the assembly.

As best seen in FIGS. 2, 3 and 4, tool 20 comprises a separate shank driver portion indicated generally at 22, a cutting head portion, indicated generally at 24, and a pilot head portion, indicated generally at 26. It should be noted that in prior art counterbore cutters the shank driver and the cutting head are integrally formed and therefore comprise the same material, usually very hard and very expensive material such as high speed steel.

In the tool of the present invention, the shank driver portion 22 includes a shank portion 28 and an enlarged head portion 30 provided with a predetermined number of slots or recesses 32 and a suitable threaded hole adapted to receive a conventional set screw 34. Shank portion 28 may be of any conventional design, such as a stub taper, straight, or radial drive or the like, to fit any conventional machine tool holder without departing from the spirit of the present invention.

Figure 5:
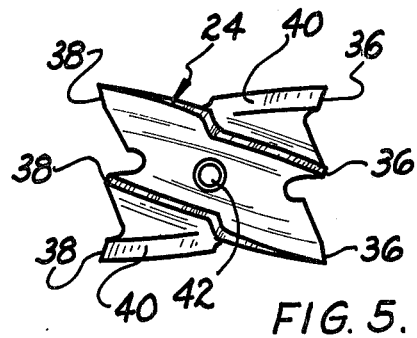
FIG. 5 is a side elevational view of cutting head portion of the assembly shown in FIG. 1.

As seen in FIGS. 3 and 5, cutter head 24 is provided with a body which has a reversible configuration providing a cutting surface at each end. Therefore one set of end cutting teeth 36 is disposed at one end and another set of teeth 38 are provided at the opposite end.

Cutter head 24 is made by controlling the flute geometry to create the same geometry front-coming as back-going. Teeth 36 and 38 then have the same helix of generation during manufacture and are appropriately milled to provide the end cutting surfaces described. The machining technique is basically conventional once the desired flute geometry is predetermined.

Each of the teeth 36 and 38 are provided with a circular margin such as at 40, to provide suitable material relief during cutting.

A conventional threaded hole and set screw 42 is provided for assembly purposes as described later herein.

Referring to FIG. 4, pilot 26 is shown and includes pilot shank portion 44. Shank portion 44 includes a pair of recesses or notches 46 which are adapted to receive set screws 34 and 42 to maintain the relative longitudinal alignment of the assembled tool 20.

To assemble the tool 20, cutting head 24 is disposed as shown with one set of the cutting teeth, such as 38, inserted into the respective slots 32 of shank head portion 30. Then the shank of pilot 24 is simply inserted through a suitable hole in cutting head 24 and a similar aligned hole in head portion 30. The set screws 34 and 42 are then properly positioned and tightened and the tool is ready for use in the conventional manner.

After the working teeth 36 are worn, the set screws referred to are removed, cutting head 24 is merely reversed and reassembled as described above and a new end cutting curface is provided.

From the foregoing description it should be readily apparent that the construction of the present invention provides several significant advantages over counterbore cutters of the prior art type. The shank driver portion 22 and the pilot 26 may be made of conventional machine tool steel, while only the cutting head 24 is of the more expensive material. Further, the reversible construction provides extra useful life of the cutting head while requiring no significant amount of extra material than is employed in a conventional single ended cutting head, however, a more economical use of that material is provided. And additionally, the heretofore discarded shank driver portion may be used over again when a new cutting head is replaced.

It is also significant to point out that the advantageous features mentioned above are provided in a construction which is relatively simple and which permits assembly and disassembly in a very simple and quick manner.

What is claimed is:

1. In a counterbore cutting tool and combination of a separate shank driver portion, a separate cutting head portion, and a pilot portion removably mounted together to form an assembly, said cutting head portion including a set of counterbore cutting teeth on each opposing end, each of said cutting teeth of said sets having an opposing tooth on the other end having a common flute possessing the same geometry when disposed in reverse position in said assembly.

2. The tool defined in claim 1 wherein said driving shank portion includes an end portion provided with a plurality of slots and wherein the teeth at each respective end of said cutting head portion are adapted to mate with said slots to form a driving connection between said driving shank portion and said cutting head portion.

3. A counterbore cutting tool comprising, in combination, a separate shank driver, a separate cutting head and a separate pilot portion removably mounted together to form an assembly, said shank driver portion including an end portion disposed adjacent to said cutting head which is provided with a plurality of slots, said cutting head portion including a set of cutting teeth on each end thereof, each tooth of said sets having a common continuously form flute with an opposing tooth on the other end which presents the same flute geometry front coming and back going; and each set of said teeth adapted to mate with said slots in said driving shank to form a driving connection between said cutting head and said driving shank.

4. In a counterbore cutting tool the combination of a separate shank driver portion provided with a shank adapted to fit conventional machines tool holders and a head portion provided with a plurality of slots; a separate counterbore cutting head provided with a pair of cutting teeth at each end, each of which are adapted to drivingly engage said slots to secure the relative position of said driver portion and cutting head against rotational motion in at least one direction, said sets of counterbore cutting teeth having the same flute geometry as said cutting teeth disposed at the opposite end when said cutting head is disposed in a reverse position with each cutting tooth of each set sharing a common continuously formed flute with the opposing tooth on the opposite end; a pilot portion including a shank extended through said cutting head and into the head portion of said shank driver portion; and removable securing means associated with said shank driver portion and said cutting head and engaging said shank of said pilot portion to prevent longitudinal movement of the assembled relationship between said shank driver, said cutting head and said pilot.

* * * * *